(12) United States Patent
Tomizawa et al.

(10) Patent No.: US 12,449,480 B2
(45) Date of Patent: Oct. 21, 2025

(54) BATTERY TEST DEVICE AND BATTERY CHARGE TESTING METHOD

(71) Applicant: TOYO SYSTEM CO., LTD., Iwaki (JP)

(72) Inventors: Yutaka Tomizawa, Fukushima (JP); Shigeki Nakajima, Fukushima (JP); Toshihiko Takagi, Fukushima (JP); Hideki Shoji, Fukushima (JP)

(73) Assignee: TOYO SYSTEM CO., LTD., Fukushima (JP)

( * ) Notice: Subject to any disclaimer, the term of this patent is extended or adjusted under 35 U.S.C. 154(b) by 562 days.

(21) Appl. No.: 18/013,177

(22) PCT Filed: Feb. 24, 2022

(86) PCT No.: PCT/JP2022/007741
§ 371 (c)(1),
(2) Date: Dec. 27, 2022

(87) PCT Pub. No.: WO2022/254827
PCT Pub. Date: Dec. 8, 2022

(65) Prior Publication Data
US 2023/0243890 A1    Aug. 3, 2023

(30) Foreign Application Priority Data
Jun. 4, 2021 (JP) .................. 2021-094564

(51) Int. Cl.
*G01R 31/36* (2020.01)
*G01R 31/3842* (2019.01)
*H02J 7/00* (2006.01)

(52) U.S. Cl.
CPC ..... *G01R 31/3646* (2019.01); *G01R 31/3842* (2019.01); *H02J 7/00714* (2020.01)

(58) Field of Classification Search
CPC ............ G01R 31/3646; G01R 31/3842; G01R 31/385; H02J 7/00714; H02J 7/00711;
(Continued)

(56) References Cited

U.S. PATENT DOCUMENTS

| | | |
|---|---|---|
| 7,498,769 B1 | 3/2009 | Potanin et al. |
| 9,312,770 B2 | 4/2016 | Tomizawa et al. |

(Continued)

FOREIGN PATENT DOCUMENTS

| | | | | |
|---|---|---|---|---|
| CN | 101421902 A | * | 4/2009 | ........ H02J 7/007182 |
| CN | 104917269 A | * | 9/2015 | .......... H02J 7/00036 |

(Continued)

OTHER PUBLICATIONS

J. Jiang, Q. Liu, C. Zhang and W. Zhang, "Evaluation of Acceptable Charging Current of Power Li-Ion Batteries Based on Polarization Characteristics," in IEEE Transactions on Industrial Electronics, vol. 61, No. 12, pp. 6844-6851, Dec. 2014. (Year: 2014).*

(Continued)

*Primary Examiner* — M Baye Diao
(74) *Attorney, Agent, or Firm* — Holtz, Holtz & Volek PC

(57) ABSTRACT

Constant current charge control for supplying a charging current of a set current value to a battery by duty-ratio control for a full-bridge circuit is executed. When the voltage between terminals of the battery rises to a set voltage value during the constant current charge control, the constant current charge control is stopped and constant voltage charge control for supplying the charging current to the battery to maintain the voltage between the terminals at the set voltage value is executed. When the charging current drops to zero during the constant voltage charge control, the constant voltage charge control is stopped and zero amp control for maintaining the charging current at zero is executed. When the voltage between the terminals rises (Continued)

above the set voltage value during the zero amp control, the zero amp control is stopped and minute discharge control is executed.

5 Claims, 8 Drawing Sheets

(58) Field of Classification Search
CPC ........ H02J 7/0047; H02J 7/04; H02J 2207/20; H02M 3/1586; H02M 3/1584; H02M 1/0083; H02M 3/155; H01M 10/44; H01M 10/48; Y02E 60/10
USPC .......................................... 320/132; 324/426
See application file for complete search history.

(56) References Cited

U.S. PATENT DOCUMENTS

| | | | |
|---|---|---|---|
| 9,716,403 | B2 | 7/2017 | Ball |
| 10,320,225 | B2 * | 6/2019 | Tian .................. H02M 3/33523 |
| 10,574,075 | B2 * | 2/2020 | Gekinozu ............... H02J 1/102 |
| 2006/0028188 | A1 | 2/2006 | Hartular et al. |
| 2008/0258687 | A1 | 10/2008 | So et al. |
| 2012/0086406 | A1 * | 4/2012 | Maeagawa ........ H02J 7/007182 |
| | | | 320/162 |
| 2014/0062396 | A1 * | 3/2014 | Reddy .................... B60L 53/22 |
| | | | 320/109 |
| 2014/0133206 | A1 | 5/2014 | Shoji et al. |
| 2015/0145491 | A1 | 5/2015 | Tomizawa et al. |
| 2015/0168967 | A1 | 6/2015 | Halder et al. |
| 2016/0105042 | A1 * | 4/2016 | Taylor ................ H01M 10/446 |
| | | | 320/134 |
| 2016/0276844 | A1 * | 9/2016 | Gekinozu ................. H02J 1/14 |
| 2020/0259338 | A1 | 8/2020 | Taylor et al. |

FOREIGN PATENT DOCUMENTS

| | | |
|---|---|---|
| CN | 105207328 A | 12/2015 |
| JP | H06141475 A | 5/1994 |
| JP | H07123597 A | 5/1995 |
| JP | 2006121873 A | 5/2006 |
| JP | 2008035620 A | 2/2008 |
| JP | 2011080966 A | 4/2011 |
| JP | 2012105467 A * | 5/2012 ............. Y02E 60/10 |
| JP | 2012161240 A * | 8/2012 ............. Y02E 60/10 |
| JP | 2013243874 A | 12/2013 |
| JP | 2014102890 A | 6/2014 |
| JP | 2014220896 A | 11/2014 |
| JP | 2015045553 A | 3/2015 |
| JP | 2015116122 A | 6/2015 |
| JP | 2015122943 A | 7/2015 |
| JP | 2020184880 A | 11/2020 |
| JP | 2021027749 A | 2/2021 |
| JP | 2021035286 A * | 3/2021 ............. Y02E 60/10 |
| JP | 2021158768 A * | 10/2021 ............. Y02E 60/10 |

OTHER PUBLICATIONS

Canadian Office Action dated May 27, 2024, issued in counterpart Canadian Application No. 3,182,392.
Notice of Allowance dated May 17, 2024, issued in related U.S. Appl. No. 17/778,070.
Extended European Search Report (EESR) dated Dec. 9, 2024, issued in counterpart European Application No. 22812406.1.
Extended European Search Report (EESR) dated Nov. 24, 2023 in related European U.S. Appl. No. 17/778,070, which is a European counterpart of related U.S. Appl. No. 17/778,070.
International Search Report (ISR) (and English translation thereof) dated Apr. 19, 2022, issued in International Application No. PCT/JP2022/007741.
Written Opinion dated Apr. 19, 2022, issued in International Application No. PCT/JP2022/007741.
International Search Report (ISR) (and English translation thereof) dated Apr. 19, 2022, issued in International Application No. PCT/JP2022/007724.
Written Opinion dated Apr. 19, 2022, issued in International Application No. PCT/JP2022/007724.
International Search Report re PCT/JP2021/036463 mailed Nov. 30, 2021 (8 pages).
Related U.S. Appl. No. 17/778,070, filed May 19, 2022.
Related U.S. Appl. No. 18/013,196, filed Dec. 27, 2022.

* cited by examiner

BATTERY TEST DEVICE AND BATTERY CHARGE TESTING METHOD

TECHNICAL FIELD

The present invention relates to a battery test device and a battery charge testing method for controlling battery charging for the purpose of a battery characteristic test.

BACKGROUND ART

A battery test device is to measure charge/discharge characteristics by performing a charge test and a discharge test respectively on a battery to be tested. As the battery test device, there is a battery test device using a bidirectional DC-DC converter as disclosed in Patent Literature 1. The bidirectional DC-DC converter is composed of a full-bridge circuit in which four switching elements are bridge-connected. A DC power supply is connected to one terminal of the bidirectional DC-DC converter, and a battery is connected to the other terminal through a choke coil. ON/OFF of each of the switching elements of the bidirectional DC-DC converter is duty-ratio controlled by a control unit in a predetermined cycle. In duty-ratio control, a ratio between a charging current period to supply a charging current from the DC power supply to the battery through the full-bridge circuit of the bidirectional DC-DC converter and the choke coil, and a discharging current period to supply a discharging current from the battery to a circuit on the DC power supply side through the choke coil and the full-bridge circuit of the bidirectional DC-DC converter is controlled. Generally, in a battery charge test mode, the charging current period becomes longer than the discharging current period to charge the battery in each predetermined cycle, while in a battery discharge test mode, the discharging current period becomes longer than the charging current period to discharge the battery in each predetermined cycle.

CITATION

Patent Literature

Patent Literature 1: Japanese Patent Application Laid-Open No. 2008-35620

SUMMARY OF INVENTION

Technical Problem

In the battery test device, the battery is charged until the voltage between terminals of the battery reaches a predetermined set voltage value in constant current/constant voltage control in the charge test mode, and after that, the voltage between the terminals of the battery is maintained at the set voltage value over a long period of time.

However, in the constant current/constant voltage control in the charge test mode, since the voltage between the terminals tends to fluctuate relatively over time due to a slight increase or decrease in charging current after the battery is charged up to the set voltage value, it is desired to execute, with high accuracy, the battery charge control and control to maintain the voltage between the terminals of the battery after that.

Therefore, it is an object of the present invention to provide a battery test device and a battery charge testing method capable of executing, with high accuracy, battery charge control and control to maintain the voltage between terminals of a battery after that.

SUMMARY OF THE INVENTION

A battery test device of the present invention includes: a DC power supply unit which outputs a DC voltage; a full-bridge circuit having a plurality of switching elements, two input terminals to which the DC voltage is applied, and two output terminals to which a positive terminal and a negative terminal of a battery are connected; and a control unit which duty-ratio controls ON/OFF of each of the plurality of switching elements of the full-bridge circuit in a predetermined cycle to charge the battery by supplying a charging current to the battery through the full-bridge circuit in a charge test mode, wherein in response to a command to start the charge test mode, the control unit executes constant current charge control to supply the charging current to the battery in such a manner that the charging current becomes equal to a set current value, when a voltage between terminals of the positive terminal and the negative terminal of the battery rises up to a set voltage value during the execution of the constant current charge control, the control unit stops the constant current charge control and executes constant voltage charge control to supply the charging current to the battery in such a manner as to maintain the voltage between the terminals at the set voltage value, when the charging current drops up to 0 [A] during the execution of the constant voltage charge control, the control unit stops the constant voltage charge control and executes zero amp control to maintain the charging current at 0 [A], and when the voltage between the terminals rises above the set voltage value during the execution of the zero amp control, the control unit stops the zero amp control and executes minute discharge control to make a minute discharging current flow out of the battery.

A battery charge testing method of the present invention is a battery charge testing method for a battery test device including: a DC power supply unit which outputs a DC voltage; a full-bridge circuit having a plurality of switching elements, two input terminals to which the DC voltage is applied, and two output terminals to which a positive terminal and a negative terminal of a battery are connected; and a control unit which duty-ratio controls ON/OFF of each of the plurality of switching elements of the full-bridge circuit in a predetermined cycle to charge the battery by supplying a charging current to the battery through the full-bridge circuit in a charge test mode, the battery charge testing method including: a step of causing the control unit to execute constant current charge control to supply the charging current to the battery in such a manner that the charging current becomes equal to a set current value in response to a command to start the charge test mode; a step in which, when a voltage between terminals of the positive terminal and the negative terminal of the battery rises up to a set voltage value during the execution of the constant current charge control, the control unit stops the constant current charge control and executes constant voltage charge control to supply the charging current to the battery in such a manner as to maintain the voltage between the terminals at the set voltage value; a step in which, when the charging current drops up to 0 [A] during the execution of the constant voltage charge control, the control unit stops the constant voltage charge control and executes zero amp control to maintain the charging current at 0 [A]; and a step in which, when the voltage between the terminals rises above the set voltage value during the execution of the zero amp control, the control unit stops the zero amp control and executes minute discharge control to make a minute discharging current flow out of the battery.

According to the battery test device and the battery charge testing method of the present invention, the constant current charge control and the constant voltage charge control can be executed to charge the battery efficiently with high accuracy to make the voltage between the terminals of the battery reach the set voltage value, and the voltage between the terminals of the battery can be maintained at the set voltage value with high accuracy by executing the zero amp control and the minute discharge control after the end of the constant current charge control and the constant voltage charge control.

DESCRIPTION OF EMBODIMENT

An example of the present invention will be described in detail with reference to the accompanying drawings.

Figure 1:
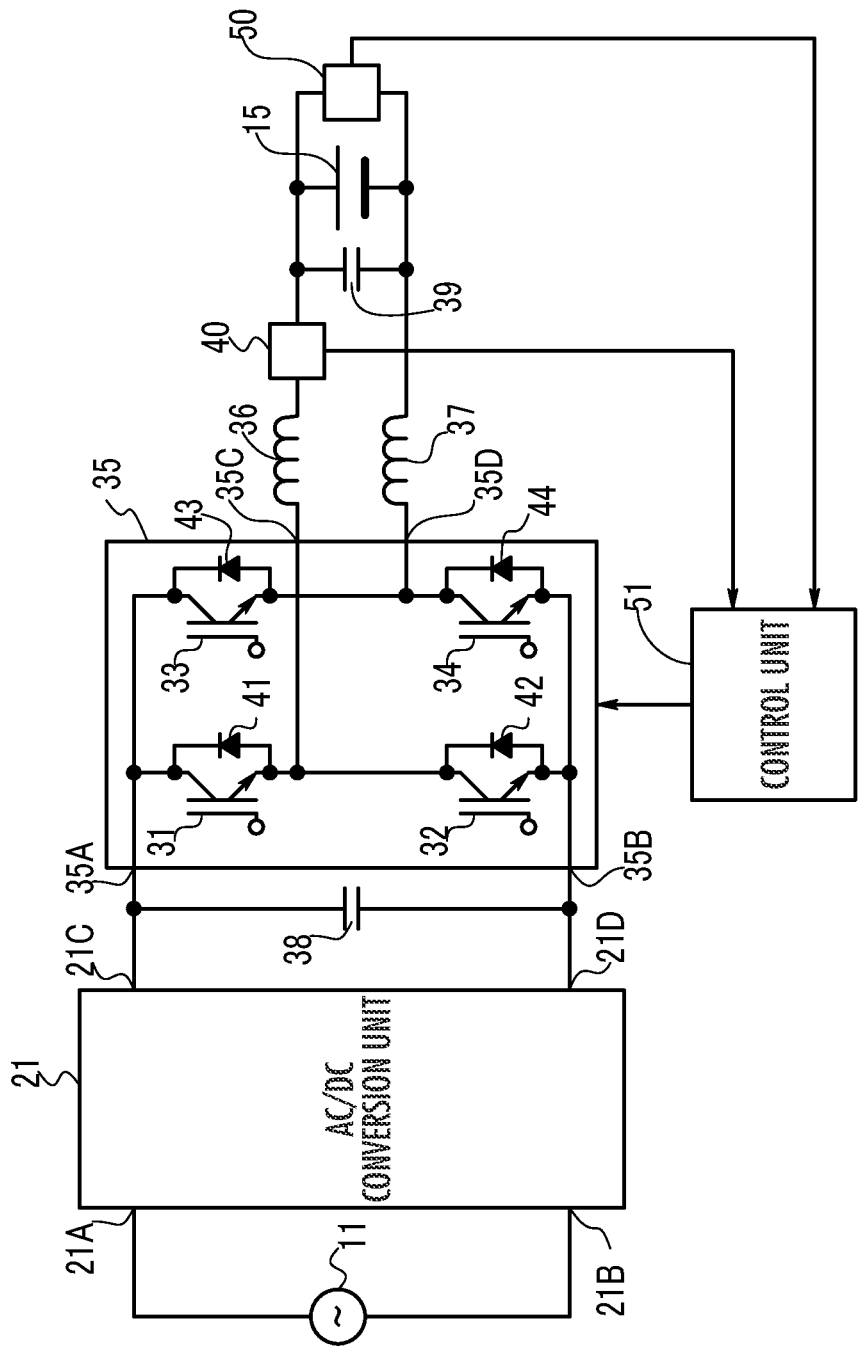
FIG. 1 is a diagram illustrating the circuit configuration of a battery charge-discharge testing device to which the present invention is applied.

FIG. 1 illustrates a battery charge-discharge testing device to which the present invention is applied. This battery charge-discharge testing device enables not only a charge test but also a discharge test on a battery. The battery charge-discharge testing device receives power supply from an AC power supply 11 as a primary power supply to perform charge-discharge tests on a battery 15 to be tested. The rated voltage of the battery 15 is, for example, 4.0 [V], but it may also be a voltage lower than that.

The battery charge-discharge testing device includes an AC/DC conversion unit 21, a full-bridge circuit 35, choke coils 36, 37, capacitors 38, 39, a current detection unit 40, a voltage detection unit 50, and a control unit 51.

The AC/DC conversion unit 21 configures a DC power supply unit, which is connected to the AC power supply 11. When an output AC voltage of the AC power supply 11 is input to input terminals 21A and 21B, the AC/DC conversion unit 21 converts the AC voltage to a predetermined DC voltage by rectifying the AC voltage, and outputs the DC voltage from output terminals 21C and 21D. The AC voltage of the AC power supply 11 is, for example, 100 [V] or 200 [V]. The output DC voltage of the AC/DC conversion unit 21 is, for example, 24.0 [V].

The capacitor 38 is connected between the output terminal 21C on the positive electrode side and the output terminal 21D on the negative electrode side of the AC/DC conversion unit 21. Further, the full-bridge circuit 35 is connected between the output terminals 21C and 21D on the positive electrode side and the negative electrode side thereof. The full-bridge circuit 35 is composed of four semiconductor switching elements 31 to 34 (first to fourth switching elements) such as IGBTs (Insulated Gate Bipolar Transistors).

In the full-bridge circuit 35, one of the input terminals (input terminal 35A), to which one ends of the semiconductor switching elements 31 and 33 are connected, is connected to the output terminal 21C, and the other of the input terminals (input terminal 35B), to which one ends of the semiconductor switching elements 32 and 34 are connected, is connected to the output terminal 21D. The other ends of the semiconductor switching elements 31 and 32 are connected to each other, and the connection point is connected from the output terminal 35C to the positive terminal of the battery 15 through the choke coil 36 and the current detection unit 40 in series. Further, the other ends of the semiconductor switching elements 33 and 34 are connected to each other, and the connection point is connected from the output terminal 35D to the negative terminal of the battery 15 through the choke coil 37. The capacitor 39 is connected between the positive terminal and the negative terminal of the battery 15. The choke coils 36 and 37 as inductors and the capacitor 39 as a capacitor construct a smoothing circuit.

Since a parasitic diode (body diode) is formed in each of the semiconductor switching elements 31 to 34 for structural reasons, each of the semiconductor switching elements 31 to 34 has each of freewheel diodes 41 to 44 to prevent damage at turnoff, respectively. Specifically, each freewheel diode 41-44 is connected to each semiconductor switching element 31-34 in parallel, respectively. When the IGBT is used as the semiconductor switching element, the cathode of the freewheel diode is connected to the collector of the IGBT, and the anode of the free-wheel diode is connected to the emitter of the IGBT.

Basically, by setting, as one cycle $T_1$ (predetermined cycle), periods including a charging current period TA in which the semiconductor switching elements 31 and 34 are ON and the semiconductor switching elements 32 and 33 are OFF, a commutation current period TB in which the semiconductor switching elements 31 to 34 are OFF and the freewheel diodes 42 and 43 are ON, a discharging current period TC in which the semiconductor switching elements 31 and 34 are OFF and the semiconductor switching elements 32 and 33 are ON, and a commutation current period TD in which the semiconductor switching elements 31 to 34 are OFF and the freewheel diodes 41 and 44 are ON, the full-bridge circuit 35 repeats the cycle. The ON/OFF (switching) of the semiconductor switching elements 31 to 34 is controlled by the control unit 51. The charging current period TA and the discharging current period TC are duty-ratio controlled. In this example, the duty ratio of this control unit 51 is denoted by DR, which is a ratio of the charging current period TA to a total period of the charging current period TA, the commutation period TB, the discharging current period TC, and the commutation period TD.

The current detection unit 40 detects a value of current flowing between the full-bridge circuit 35 and the battery 15, and outputs the value as a battery current Idec. In other words, the current detection unit 40 detects a charging current value to charge the battery 15 in a charge test mode, and detects a discharging current value upon discharging the battery 15 in a discharge test mode. The current detection unit 40 is composed, for example, of a resistor, a current sensor, and the like. The voltage detection unit 50 detects a voltage Vdec between the positive and negative terminals of the battery 15.

The control unit 51 is composed, for example, of a microcomputer. The respective outputs of the current detection unit 40 and the voltage detection unit 50 are connected to the control unit 51, and the battery current Idec detected by the current detection unit 40 and the voltage Vdec between the terminals detected by the voltage detection unit 50 are supplied to the control unit 51. The control unit 51 is connected to the full-bridge circuit 35 to generate a control signal to control ON/OFF of each of the semiconductor switching elements 31 to 34 in the full-bridge circuit 35. The control signal is supplied to the gate of each of the semiconductor switching elements 31 to 34 in the full-bridge circuit 35.

Next, the operation of the battery charge-discharge testing device having such a configuration according to the present invention will be described.

When the output AC voltage of the AC power supply 11 is supplied to the AC/DC conversion unit 21, the AC/DC conversion unit 21 outputs a DC voltage. The output DC voltage of the AC/DC conversion unit 21 is supplied between the input terminals 35A and 35B of the full-bridge circuit 35. A positive potential 24.0 [V] is applied to the input terminal 35A, and a potential 0 [V] is applied to the input terminal 35B.

For example, at regular intervals, the control unit 51 determines a duty ratio DR according to the battery current Idec as the charging current or the discharging current obtained from the current detection unit 40, and the voltage Vdec between the terminals of the battery 15 obtained from the voltage detection unit 50 in such a manner that the voltage Vdec between the terminals of the battery 15 becomes a predetermined set voltage value, or that each of the charging current and the discharging current becomes a predetermined set current value, and supplies a control signal indicative of the duty ratio DR to the full-bridge circuit 35.

Figure 2:
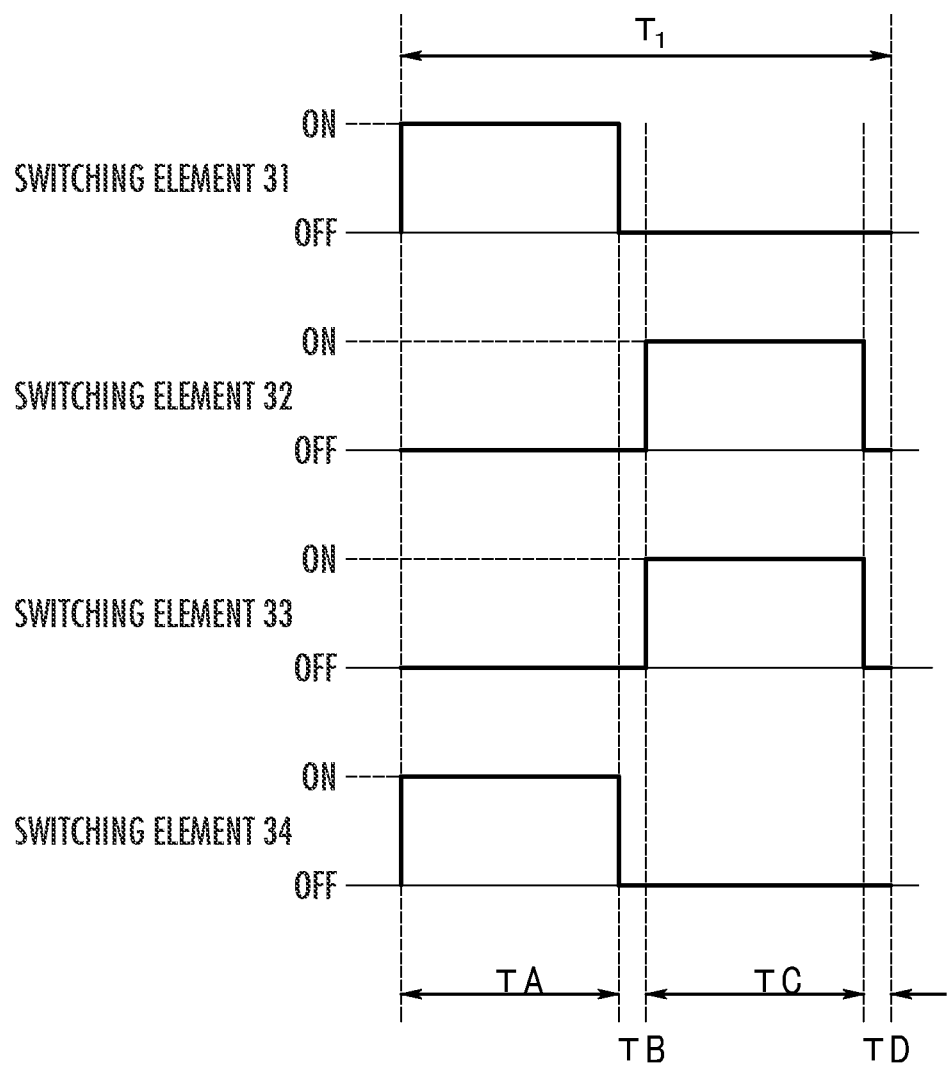
FIG. 2 is a time chart illustrating an ON/OFF state of each switching element in a full-bridge circuit inside the device of FIG. 1.

As illustrated in FIG. 2, ON/OFF control of the semiconductor switching elements 31 to 34 in the full-bridge circuit 35 is repeatedly performed by setting the charging current period TA, the commutation current period TB (first commutation current period), the discharging current period TC, and the commutation current period TD (second commutation current period) as one cycle $T_1$. In the charging current period TA, the semiconductor switching elements 31 and 34 are ON, and the semiconductor switching elements 32 and 33 are OFF, and in the discharging current period TC, the semiconductor switching elements 31 and 34 are OFF, and the semiconductor switching elements 32 and 33 are ON. In the commutation current period TB immediately after the end of the charging current period TA, all the semiconductor switching elements 31 to 34 are turned off. Similarly, in the commutation current period TD immediately after the end of the discharging current period TC, all the semiconductor switching elements 31 to 34 are also turned off. For example, in a case of control when the duty ratio DR is 50%, the charging current period TA and the discharging current period TB have a length $\{T_1(TB+TD)\}/2$ equal to each other.

Figure 3:
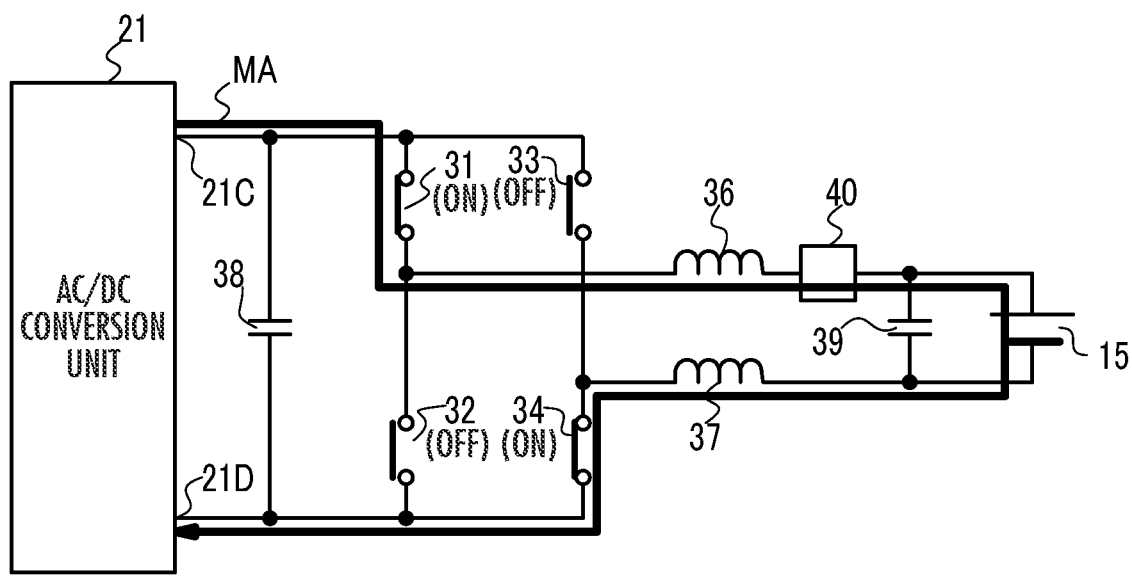
FIG. 3 is a diagram illustrating a charging current path in the battery charge-discharge testing device during a charging current period TA in FIG.

In the charging current period TA, as indicated by an arrow MA in FIG. 3, the charging current flows into the battery 15 from the positive terminal of the battery 15 through the output terminal 21C of the AC/DC conversion unit 21, the semiconductor switching element 31, the choke coil 36, and the current detection unit 40 in this order, and then flows from the negative terminal of the battery 15 through the choke coil 37, the semiconductor switching element 34, and the output terminal 21D of the AC/DC conversion unit 21 in this order. This charging current flow causes the battery 15 to be charged, and the electric charge is stored in the battery 15.

Figure 4:
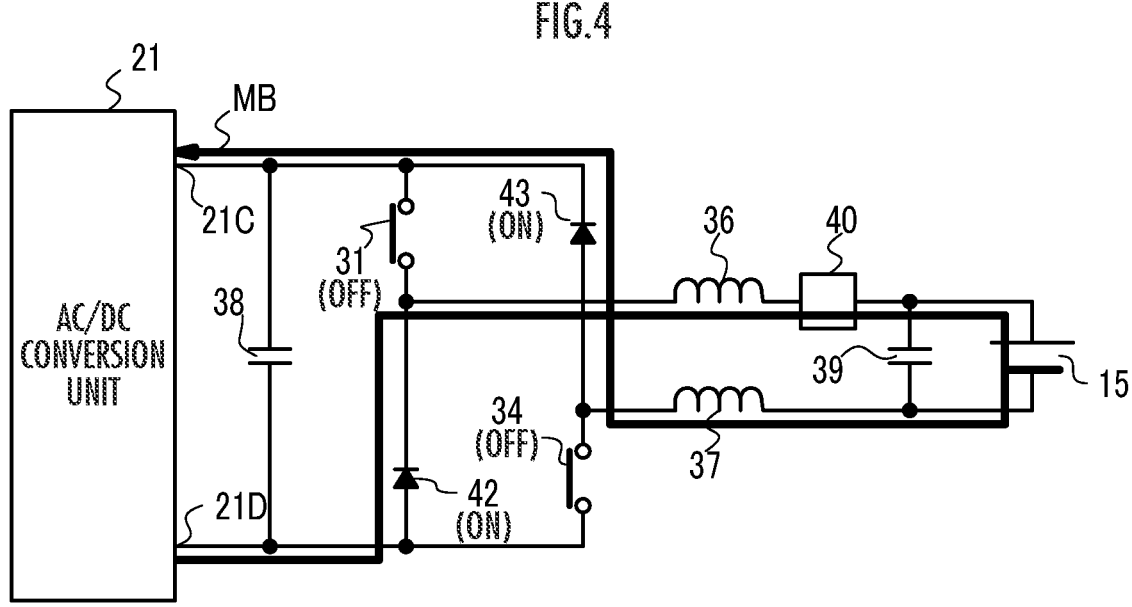
FIG. 4 is a diagram illustrating a commutation current path in the battery charge-discharge testing device during a commutation current period TB in FIG. 2.

In the commutation current period TB, as indicated by an arrow MB in FIG. 4, energy stored in the choke coils 36 and 37 in the charging current period TA makes a commutation current flow in the flowing direction of the charging current. In this commutation current period TB, the freewheel diodes 42 and 43 are turned on to make the commutation current flow in a path of the output terminal 21D of the AC/DC conversion unit 21, the freewheel diode 42, the choke coil 36, the current detection unit 40, the battery 15, the choke coil 37, the freewheel diode 43, and the output terminal 21C of the AC/DC conversion unit 21 to charge the battery 15.

Figure 5:
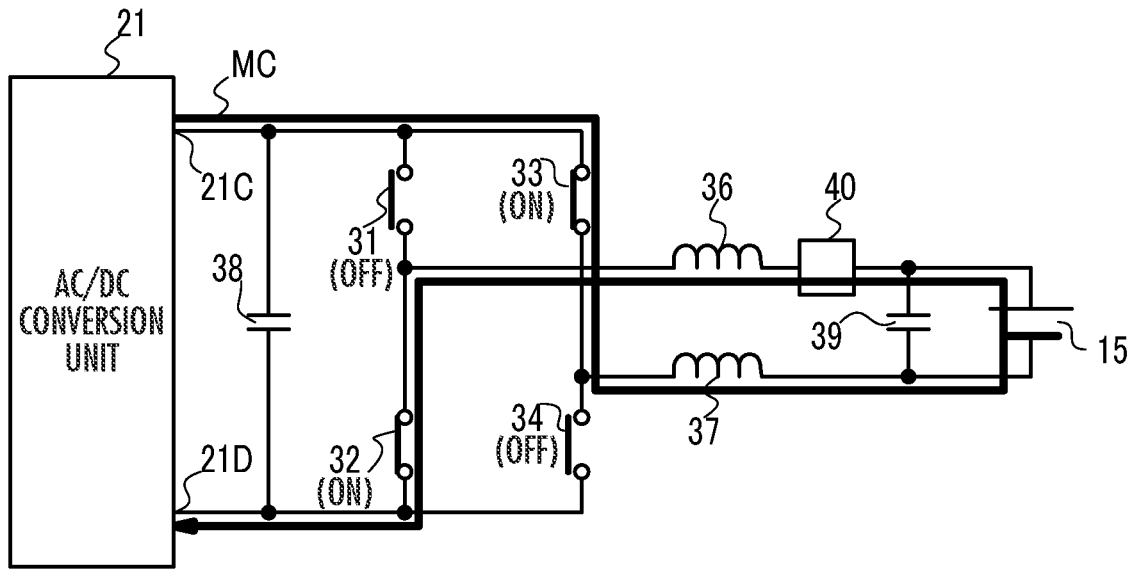
FIG. 5 is a diagram illustrating a discharging current path in the battery charge-discharge testing device during a discharging current period TC in FIG. 2.

In the discharging current period TC, as indicated by an arrow MC in FIG. 5, a discharging current flows through the output terminal 21C of the AC/DC conversion unit 21, the semiconductor switching element 33, the choke coil 37, and the negative terminal of the battery 15, and further from the positive terminal of the battery 15 into the output terminal 21D of the AC/DC conversion unit 21 through the current detection unit 40, the choke coil 36, and the semiconductor switching element 32 in this order. This discharging current is a current flowing out of the battery 15 to discharge the electric charge stored in the battery 15.

Figure 6:
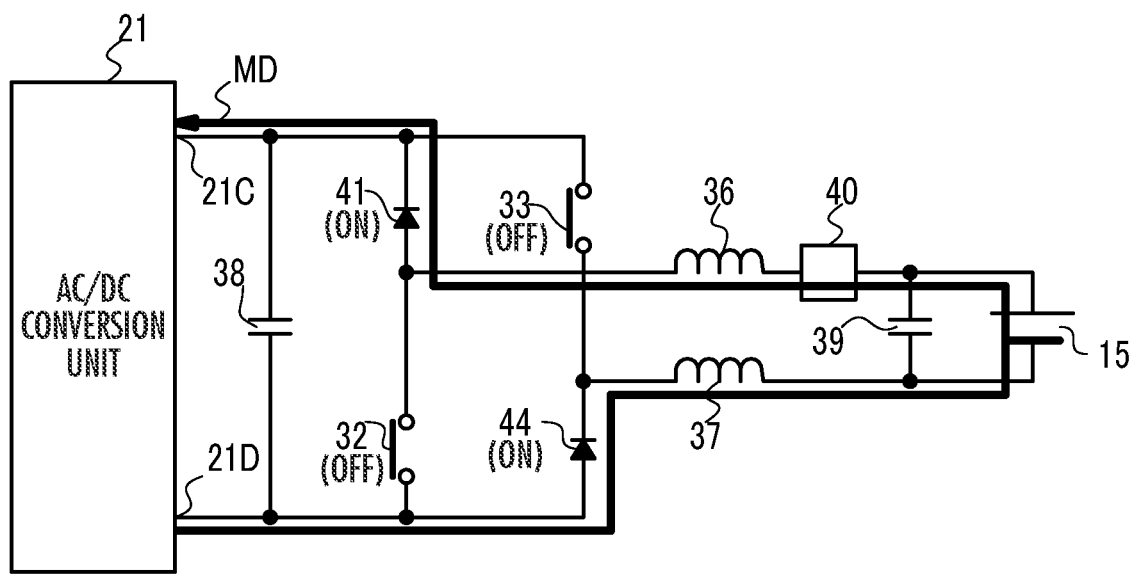
FIG. 6 is a diagram illustrating a commutation current path in the battery charge-discharge testing device during a commutation current period TD in FIG. 2.

In the commutation current period TD, as indicated by an arrow MD in FIG. 6, energy stored in the choke coils 36 and 37 in the discharging current period TC makes a commutation current flow in the flowing direction of the discharging current. In the commutation current period TD, the freewheel diodes 41 and 44 are turned on to make the commutation current flow from the output terminal 21D of the AC/DC conversion unit 21 into a path of the freewheel diode 44, the choke coil 37, the battery 15, the current detection unit 40, the choke coil 36, the freewheel diode 41, and then the output terminal 21C of the AC/DC conversion unit 21 to obtain discharge power due to communication between the output terminals 21C and 21D as regenerative power. A total voltage of a voltage between terminals of the choke coil 36, a voltage between the terminals of the battery 15, and a voltage between terminals of the choke coil 37 is generated between the output terminals 21C and 21D as a regenerative voltage.

According to the duty ratio DR as a ratio between the charging current period TA and the discharging current period TC in the one cycle $T_1$ mentioned above, the operation of the one cycle $T_1$ is determined to be the charge test mode or the discharge test mode opposite to the charge test mode. In the control of the duty ratio DR in the charge test mode, since the charging current period TA in the one cycle $T_1$ increases but the discharging current period TC decreases, the amount of charge to the battery 15 by the charging current in the charging current period TA exceeds the amount of discharge from the battery 15 by the discharging current in the discharging current period TC. This results in the fact that the charging current flows into the battery 15 in the one cycle $T_1$ to charge the battery 15.

On the other hand, in the control of the duty ratio DR in the discharge test mode, since the charging current period TA in the one cycle $T_1$ decreases but the discharging current period TC increases, the amount of discharge from the battery 15 by the discharging current in the discharging current period TC exceeds the charge amount by the charging current in the charging current period TA. This results in the fact that the discharging current flows out of the battery 15 in the one cycle $T_1$ to discharge the battery 15.

Figure 7:
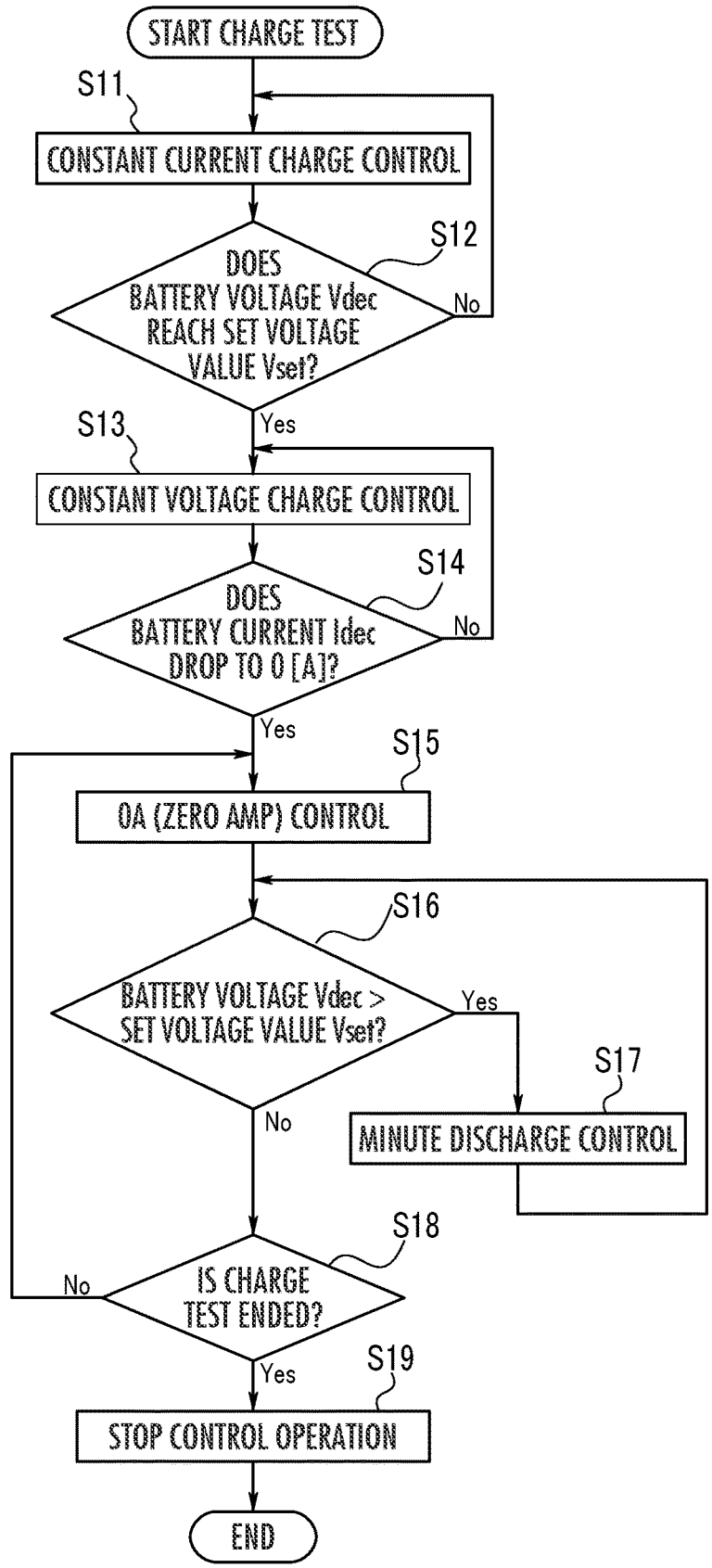
FIG. 7 is a flowchart illustrating control operation of a control unit in the battery charge-discharge testing device of FIG. 1.

When receiving a command from the outside to start a charge test for constant current/constant voltage control, the control unit 51 becomes a constant voltage/constant current charge testing mode. In the charge test mode, as illustrated in FIG. 7, the control unit 51 first executes constant current charge control (step S11). The constant current charge control is control for charging the battery 15 by supplying a charging current in such a manner that the charging current supplied to the battery 15 becomes a constant current value, that is, becomes a current equal to a set current value Iset. In the constant current charge control, the duty ratio DR is controlled in such a manner that the battery current Idec detected by the current detection unit 40 at regular intervals becomes the set current value Iset, for example, 1 [A]. For example, when the battery current Idec is higher than the set current value Iset, the duty ratio DR is decreased by a control displacement value ΔDR1, while when the battery current Idec is lower than the set current value Iset, the duty ratio DR is increased by the control displacement value ΔDR1. Then, when the battery current Idec is equal to the set current value Iset, the duty ratio DR at the time is maintained.

The control unit 51 determines whether or not the voltage (battery voltage) Vdec between the terminals of the battery 15 reaches a set voltage value Vset during the execution of the constant current charge control (step S12). As described above, the voltage Vdec between the terminals of the battery 15 is detected by the voltage detection unit 50. When Vdec<Vset, the constant current charge control in step S11 is continued. When Vdec≥Vset, the control unit 51 stops the constant current charge control and executes constant voltage charge control (step S13). The constant voltage charge control is control for charging the battery 15 by supplying a charging current to the battery 15 in such a manner that the voltage Vdec between the terminals of the battery 15 is maintained at a constant voltage value, that is, at the set voltage value Vset. In the constant voltage charge control, the duty ratio DR is controlled in such a manner that the voltage Vdec between the terminals detected by the voltage detection unit 50 at regular intervals becomes the set voltage value Vset, for example, 4.0 [V]. For example, when the voltage Vdec between the terminals is higher than the set voltage value Vset, the duty ratio DR is decreased by a control displacement value ΔDR2, while when the detected voltage Vdec is lower than the set voltage value Vset, the duty ratio DR is increased by the control displacement value ΔDR2. Then, when the detected voltage Vdec is equal to the set voltage value Vset, the duty ratio DR at the time is maintained.

During the execution of the constant voltage charge control, the control unit 51 determines whether or not the battery current Idec detected by the current detection unit 40 reaches 0 [A] (step S14). When Idec>0 [A], the constant voltage charge control in step S13 is continued. On the other hand, when Idec≤0 [A], the control unit 51 executes zero amp control (step S15). The zero amp control is control in which the charging current to the battery 15 is set to 0 [A] at which there is almost no charging to the battery 15. In the zero amp control, the duty ratio DR is maintained at the present value in every cycle $T_1$. However, when the battery current Idec becomes lower than 0 [A], the duty ratio DR will be able to be increased by a control displacement value ΔDR3. The control displacement value ΔDR3 is a very small minute value compared with the control displacement values ΔDR1 and ΔDR2.

Figure 8:
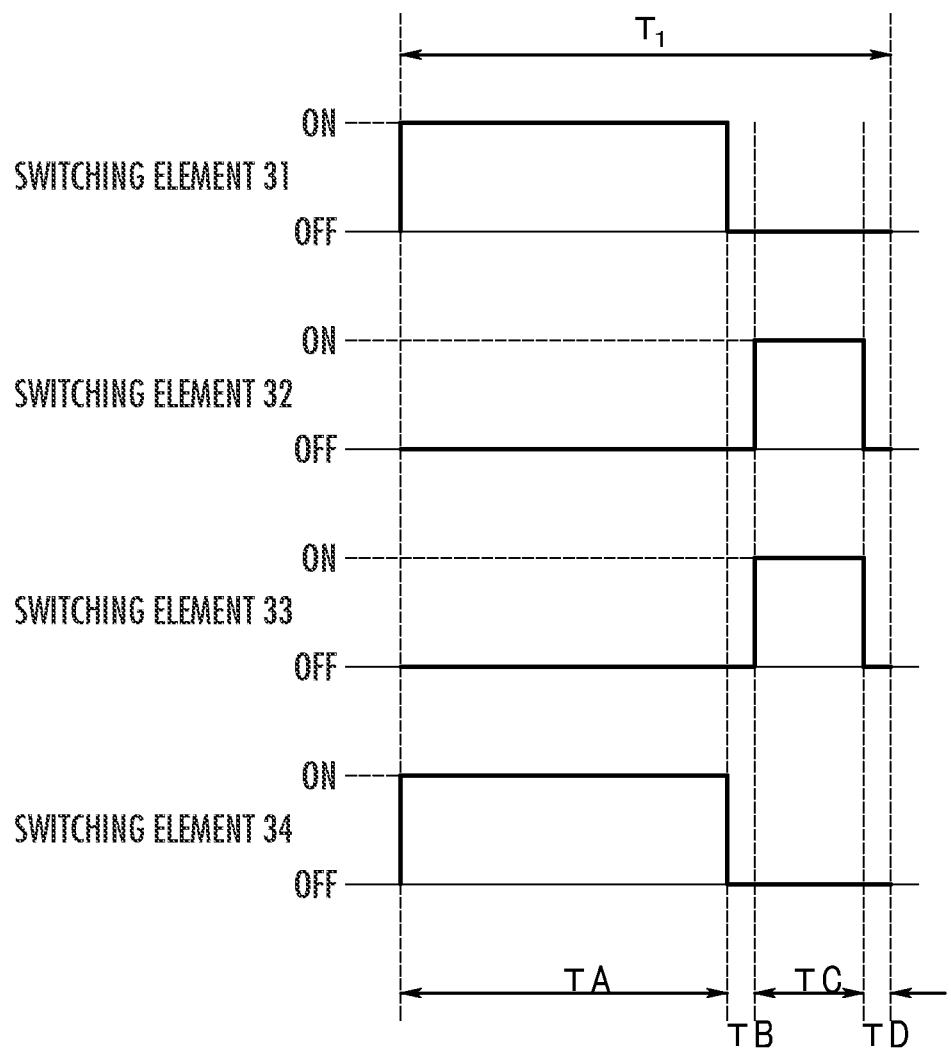
FIG. 8 is a time chart illustrating an ON/OFF state of each switching element in the full-bridge circuit during zero amp control.

During the zero amp control, since the voltage Vdec between the terminals of the battery 15 is at the set voltage value Vset, for example, 4.0 [V], the charging current period TA defined by ON/OFF of the semiconductor switching elements 31 to 34 in one cycle $T_1$ becomes longer than the discharging current period TC as illustrated in FIG. 8 to maintain the current flowing through the battery 15 at 0 [A]. In other words, the duty ratio DR is set to TA>TC.

During the execution of the zero amp control, the control unit 51 determines whether or not the voltage Vdec between the terminals of the battery 15 is higher than the set voltage value Vset (step S16). When Vdec>Vset, the control unit 51 stops the zero amp control and executes minute discharge control (step S17). The minute discharge control is control for making a minute discharging current flow out of the battery 15. In the minute discharge control, the duty ratio DR is decreased by a control displacement value ΔDR4 from the present value in every cycle $T_1$. ΔDR4 may be the same minute value as the control displacement value ΔDR3.

During the execution of the minute discharge control, the control unit 51 returns to step S16 to determine whether or not the voltage Vdec between the terminals of the battery 15 is higher than the set voltage value Vset. When Vdec>Vset during the execution of the minute discharge control, the minute discharge control is continued.

On the other hand, when Vdec≤Vset in step S16, the control unit 51 determines whether or not the charge test is ended (step S18). When receiving a command from the outside to end the charge test, or when a predetermined charge test time has passed, the control unit 51 determines the end of the charge test. When receiving no command from the outside to end the charge test, the control unit 51 determines that it is not the end of the charge test and executes the zero amp control in step S15. Thus, when Vdec≤Vset by the execution of the minute discharge control and further the charge test is not ended, the minute discharge control is stopped and the zero amp control is resumed.

When determining the end of the charge test in step S18, the control unit 51 stops the control operation of the charge test including the zero amp control or the minute discharge control (step S19).

Figure 9:
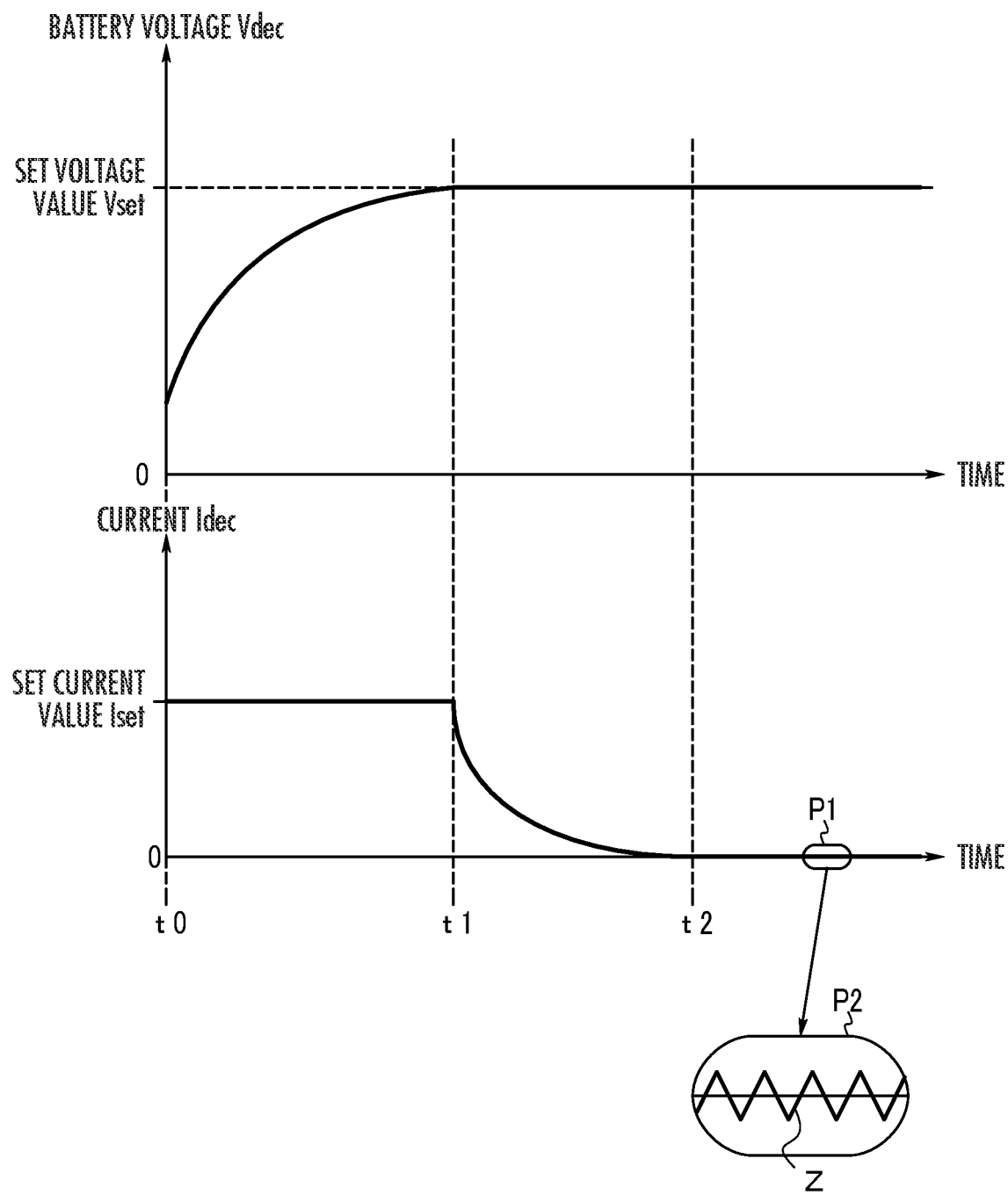
FIG. 9 is a graph illustrating changes in voltage between terminals of a battery and current flowing through the battery according to the control operation of a control unit.

As illustrated in FIG. 9, the voltage Vdec between the terminals of the battery 15 and the battery current Idec in the charge test mode respectively change over time by the control operation of the control unit 51 mentioned above. In FIG. 9, when the charge test is started at time point t0, the constant current charge control in step S11 is first executed. During the constant current charge control, the charging current supplied to the battery 15 is controlled to the set current value Iset and maintained constant. The voltage Vdec between the terminals of the battery 15 with such a constant charging current supplied thereto gradually increases.

At time point t1, when the voltage Vdec between the terminals of the battery 15 reaches the set voltage value Vset, the constant current charge control is stopped and the constant voltage charge control in step S13 is started instead. During the constant voltage charge control, the charging current is supplied to the battery 15 to maintain the voltage Vdec between the terminals of the battery 15 at the set voltage value Vset. Thus, the charging current, that is, the battery current Idec decreases.

At time point t2, when the charging current drops up to 0 [A], the constant voltage charge control is stopped and the zero amp control in step S15 is started instead. During the zero amp control, no charging current substantially flows in the cycle $T_1$. However, since the ON/OFF operations of the semiconductor switching elements 31 to 34 of the full-bridge circuit 35 are continued even during the zero amp control, a minute charging current may flow through the battery 15 due to noise or the like by the ON/OFF operations. When such a minute charging current flows, since the battery 15 is charged, the voltage Vdec between the terminals of the battery 15 rises above the set voltage value Vset. Since this rise in the voltage Vdec between the terminals is transmitted to the control unit 51 through the voltage detection unit 50, the zero amp control is stopped and the minute discharge control in step S17 is started instead.

Figure 10:
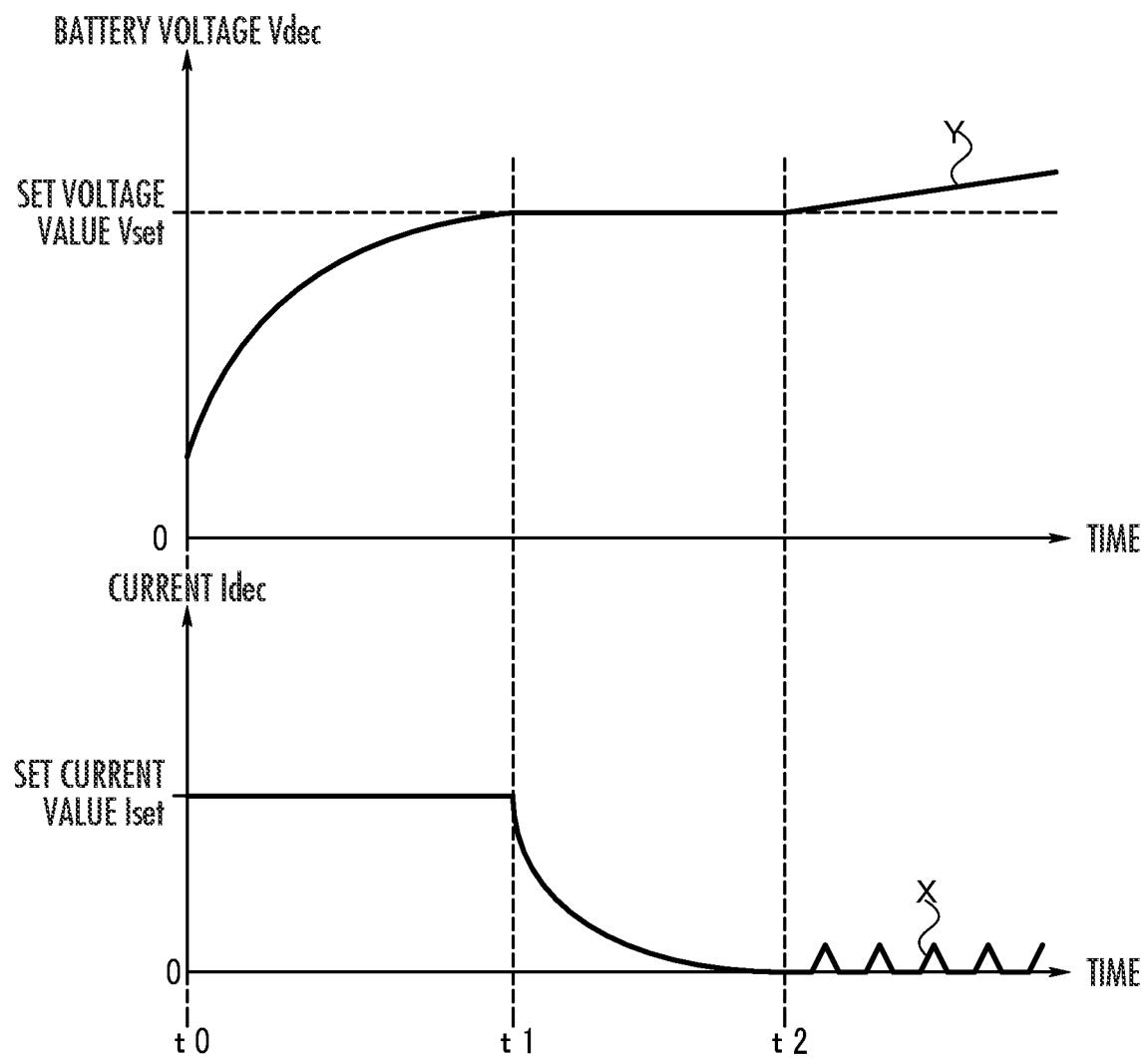
FIG. 10 is a graph illustrating changes in voltage between the terminals of the battery and current flowing through the battery in a case of control operation in a charge test mode when minute discharge control is not provided.

In the meantime, in a charge test mode in which the minute discharge control in step S17 is not provided, since the zero amp control is continued after time point t2, a minute charging current (indicated by X in FIG. 10) flows intermittently due to noise or the like by the ON/OFF operations of the semiconductor switching elements 31 to 34 as illustrated in FIG. 10. Since the battery 15 is charged by the intermittent, minute charging current, the voltage Vdec between the terminals of the battery 15 gradually rises above the set voltage value Vset as indicated by Y in FIG. 10. Therefore, the voltage Vdec between the terminals of the battery 15 cannot be maintained at the set voltage value Vset.

On the other hand, in the example of the present invention, since the minute discharge control in step S17 is provided, when the voltage Vdec between the terminals of the battery 15 rises above the set voltage value Vset during the zero amp control, the minute discharge control in step S17 is started instead of the zero amp control as mentioned above. In FIG. 9, some characteristics P1 of the current characteristics during the minute discharge control are expanded and illustrated as characteristics P2. When Vdec>Vset during the minute discharge control as indicated by Z in the expanded characteristics P2, since a minute discharging current flows out of the battery 15, the battery 15 is slightly discharged, and the voltage Vdec between the terminals of the battery 15 drops. Thus, as illustrated in FIG. 9, since a minute charging current and a minute discharging current flow with 0 [A] as the boundary by repeating the zero amp control and the minute discharge control after time point t2, the voltage Vdec between the terminals of the battery 15 can be maintained at the set voltage value Vset with high accuracy.

Note that, in the example mentioned above, the minute discharge control is executed when the voltage Vdec between the terminals of the battery 15 becomes higher than the set voltage value Vset in step S16, but an allowable range may also be provided for the set voltage value Vset. In other words, the minute discharge control may also be executed when the voltage Vdec between the terminals of the battery 15 becomes higher than the set voltage value Vset+an allowable range ΔV.

Further, the specific numerical values in the example mentioned above, such as the output DC voltage value of the AC/DC conversion unit 21, the set voltage value Vset, and the set current value Iset, are just examples in the present invention, and the present invention is not limited to these numerical values. In the present invention, these numerical values may of course be changed depending on the characteristics of the battery used, the charge/discharge conditions, and the like.

DESCRIPTION OF REFERENCE NUMERALS

11 AC power supply
15 battery
21 AC/DC conversion unit
31 to 34 semiconductor switching element
35 full-bridge circuit
36, 37 choke coil
38, 39 capacitor
40 current detection unit
41 to 44 freewheel diode
50 voltage detection unit
51 control unit

The invention claimed is:

1. A battery test device comprising:
a DC power supply unit which outputs a DC voltage;
a full-bridge circuit having a plurality of switching elements, two input terminals to which the DC voltage is applied, and two output terminals to which a positive terminal and a negative terminal of a battery are connected; and
a control unit which duty-ratio controls ON/OFF of each of the plurality of switching elements of the full-bridge circuit in a predetermined cycle to charge the battery by supplying a charging current to the battery through the full-bridge circuit in a charge test mode,
wherein:
in response to a command to start constant current/constant voltage control in the charge test mode, the control unit executes constant current charge control to supply the charging current to the battery in such a manner that the charging current becomes equal to a set current value,
when a voltage between terminals of the positive terminal and the negative terminal of the battery rises up to a set voltage value during the execution of the constant current charge control, the control unit stops the constant current charge control and executes constant voltage charge control to supply the charging current to the battery in such a manner as to maintain the voltage between the terminals at the set voltage value,
when the charging current drops to 0 [A] during the execution of the constant voltage charge control, the control unit stops the constant voltage charge control and executes zero amp control to maintain the charging current at 0 [A], and
when the voltage between the terminals rises above the set voltage value during the execution of the zero amp control, the control unit stops the zero amp control and executes minute discharge control to make a minute discharging current flow out of the battery.

2. The battery test device according to claim 1, wherein when the voltage between the terminals drops to the set voltage value during the execution of the minute discharge control, the control unit stops the minute discharge control and executes the zero amp control.

3. The battery test device according to claim 1, wherein:
the full-bridge circuit is composed of a first switching element, a second switching element, a third switching element, and a fourth switching element, one end of the first switching element and one end of the third switching element are connected to one of the two input terminals, one end of the second switching element and one end of the fourth switching element are connected to the other of the two input terminals, the other end of the first switching element and the other end of the second switching element are connected to one of the two output terminals, the other end of the third switching element and the other end of the fourth switching element are connected to the other of the two output terminals, the two output terminals are connected to the positive terminal and the negative terminal of the battery through a smoothing circuit including inductors and capacitors, respectively, the control unit configures, within the predetermined cycle, a charging current period, a first commutation current period immediately after the charging current period, a discharging current period, and a second commutation current period immediately after the discharging current period, in the charging current period, the control unit controls the first switching element and the fourth switching element to ON, and controls the second switching element and the third switching element to OFF to supply the charging current to the battery, in the first commutation current period, the control unit controls the first to fourth switching elements to OFF to make a first commutation current flow in a direction of the charging current through respective freewheel diodes of the second switching element and the third switching element by energy stored in the inductors, in the discharging current period, the control unit controls the first switching element and the fourth switching element to OFF, and controls the second switching element and the third switching element to ON to make the discharging current flow out of the battery, in the second commutation current period, the control unit controls the second and third switching elements to OFF to make a second commutation current flow in a direction of the discharging current through respective freewheel diodes of the first switching element and the fourth switching element by energy stored in the inductors, and the control unit performs the duty-ratio control according to a ratio between the charging current period and the discharging current period.

4. The battery test device according to claim 3, wherein the charging current period is longer than the discharging current period during the execution of the zero amp control.

5. A battery charge testing method for a battery test device including: a DC power supply unit which outputs a DC voltage; a full-bridge circuit having a plurality of switching elements, two input terminals to which the DC voltage is applied, and two output terminals to which a positive terminal and a negative terminal of a battery are connected; and a control unit which duty-ratio controls ON/OFF of each of the plurality of switching elements of the full-bridge circuit in a predetermined cycle to charge the battery by supplying a charging current to the battery through the full-bridge circuit in a charge test mode, the battery charge testing method comprising:

a step of causing the control unit to execute constant current charge control to supply the charging current to the battery in such a manner that the charging current becomes equal to a set current value in response to a command to start constant current/constant voltage control in the charge test mode;

a step in which, when a voltage between terminals of the positive terminal and the negative terminal of the battery rises up to a set voltage value during the execution of the constant current charge control, the control unit stops the constant current charge control and executes constant voltage charge control to supply the charging current to the battery in such a manner as to maintain the voltage between the terminals at the set voltage value;

a step in which, when the charging current drops to 0 [A] during the execution of the constant voltage charge control, the control unit stops the constant voltage charge control and executes zero amp control to maintain the charging current at 0 [A]; and a step in which, when the voltage between the terminals rises above the set voltage value during the execution of the zero amp control, the control unit stops the zero amp control and executes minute discharge control to make a minute discharging current flow out of the battery.

* * * * *